March 12, 1968     A. J. ARSENAULT     3,372,509
FISHING ROD HANDLING DEVICE
Filed Oct. 19, 1965     4 Sheets-Sheet 1
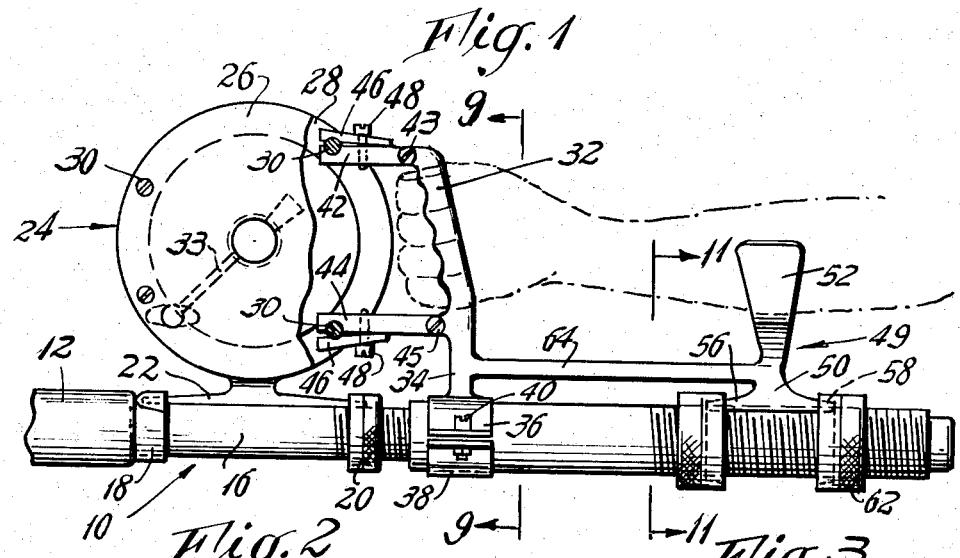
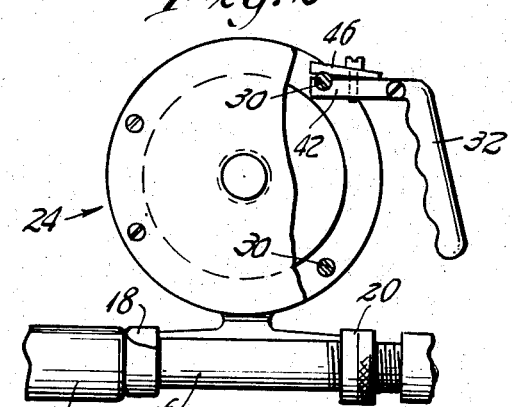
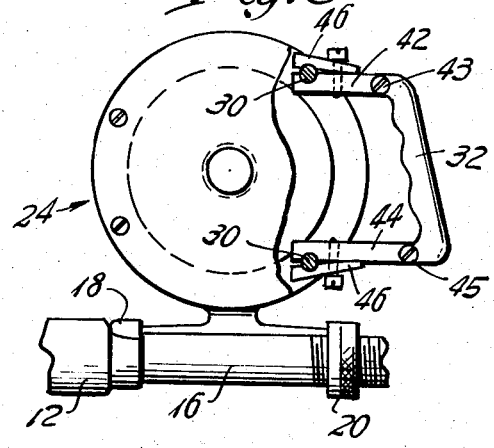
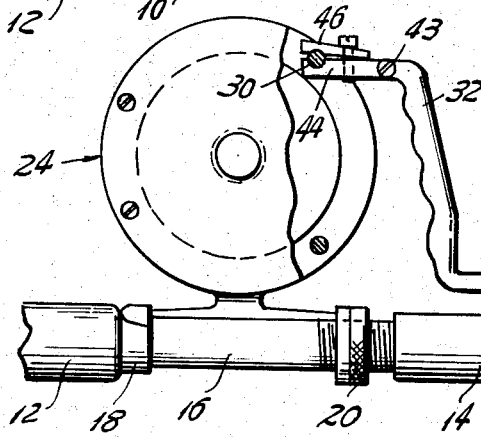
INVENTOR.
Albert J. Arsenault
BY
Johnson and Kline
ATTORNEYS

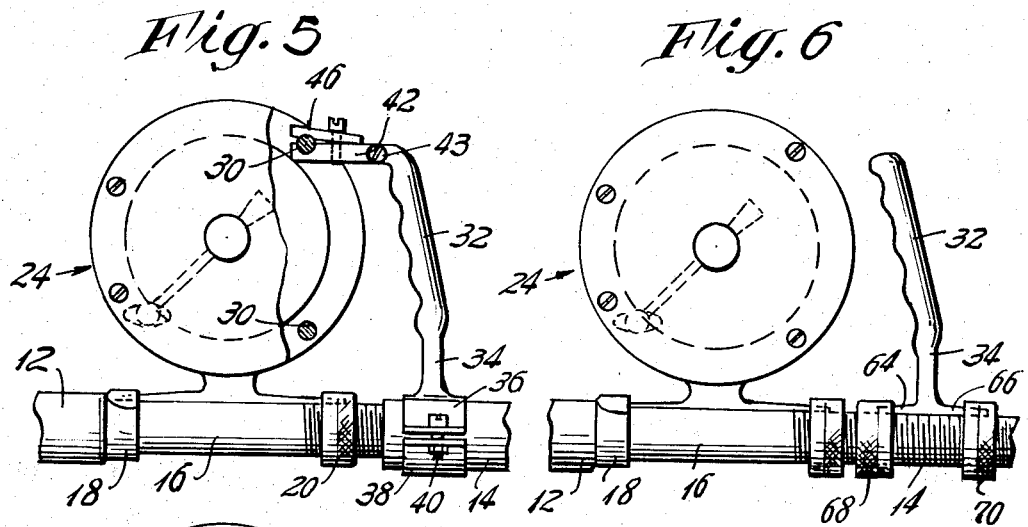

March 12, 1968

A. J. ARSENAULT 3,372,509

FISHING ROD HANDLING DEVICE

Filed Oct. 19, 1965

INVENTOR.
Albert J. Arsenault
BY
Johnson and Kline
ATTORNEYS

March 12, 1968  A. J. ARSENAULT  3,372,509
FISHING ROD HANDLING DEVICE
Filed Oct. 19, 1965  4 Sheets-Sheet 4

INVENTOR.
Albert J. Arsenault
BY
Johnson and Kline
ATTORNEYS

United States Patent Office 3,372,509
Patented Mar. 12, 1968

3,372,509
FISHING ROD HANDLING DEVICE
Albert J. Arsenault, 430 Albert Ave.,
Stratford, Conn. 06497
Filed Oct. 19, 1965, Ser. No. 497,759
15 Claims. (Cl. 43—21.2)

ABSTRACT OF THE DISCLOSURE

A handling device for a fishing rod having conventional or suitable means for removably mounting a reel on the rod, in which an upwardly and slightly forwardly extending hand grip is mounted on the rod, the device having one or more arms directly and removably mounting and securing the hand grip to the reel. The hand grip may also be removably connected and secured directly to the handle of the rod and the connection may include an arm support mounted on and secured to the butt end portion of the rod.

---

This invention relates generally to improvements in fishing equipment, and more particularly to a handling device for a fishing rod which aids a user in holding and supporting the rod while he is using it under various conditions where forces are encountered which normally tend to break his grip on the rod handle.

It is a principal object of the present invention to provide a fishing rod handling device which aids the user in the proper support of the rod by permitting the user to maintain his forearm, wrist, and hand substantially parallel with the axis of the rod, and in substantial alignment with the axis of the reel in upwardly spaced relationship with the axis of the rod, thereby reducing to a minimum the axial rotative force imposed upon the rod and the user's wrist while playing and reeling in a fish.

This is accomplished in the broadest aspect of the invention by the provision of an elongate substantially vertically extending hand grip which is positioned rearwardly of the reel. The hand grip is disposed in vertically spaced relationship with the rod handle portion so that the approximate midpoint of the hand grip lies in a plane parallel to the rod and passing through the reel. The hand grip preferably has a slight forward inclination and lies in the vertical plane of swinging movement of the rod, the direction and upward projection of the hand grip being such that the palm and fingers of the user may encircle the hand grip while the forearm, wrist, and hand of the user are disposed in substantial parallelism with the axis of the rod.

The hand grip is connected to the rod in the position described either by being connected directly to the reel or directly to the rod handle portion, or by a combination of both, depending upon the intended type of usage of the rod and reel and the forces imposed thereon by such usage.

A further object of the present invention is to provide a fishing rod handling device having a combined hand grip and arm support which coact to relieve the pressure of holding or manipulating the rod from the user's wrist and transfer the pressure to the user's forearm which is better able to resist the bending effect otherwise imposed on the wrist by forces acting on the rod tip.

This is achieved by the provision of an upwardly facing bilateral support or yoke disposed rearwardly of the hand grip in position to engage and partially encircle the user's forearm approximately midway between his elbow and wrist. The arm support is further positioned in relation to the axis of the rod so that the user's hand, wrist, and forearm are in substantial axial parallelism with the rod. The yoke is continuously urged against the user's arm by an upward force about the user's hand as a fulcrum, in response to the weight of the rod or a downward pull on the tip of the rod, thereby preventing the rear end of the rod from slipping off the user's arm.

Heretofore known handling grips for fishing rods, whether or not combined with arm supports, have not been found to be adequate to achieve the objects and provide the advantages of the present invention. Prior art pistol grips are, for the most part, disposed to extend downwardly from a reel seat and therefore create a lever between the pistol grip and the reel crank which tends to rotate the rod about its axis when the reel is being operated under load. In addition, prior art hand grips combined with arm supports have been found to be cumbersome and unwieldy, in that they frequently require motion-constraining supports such as sockets, braces, straps, etc., for connecting some portion of the rod to a portion of the user's body other than his fishing arm. Also, most prior art handling devices fail to eliminate the usual twist or bend of the wrist associated with gripping of the rod in a conventional manner.

Other objects of the invention are to provide a fishing rod handling device which is compact and light in weight, which does not interfere with any of the customary manipulations of the rod during use, which is easily installed on and removed from a variety of types of fishing rods and which is economical to manufacture and sell.

Further objects and advantages of the present invention will become apparent from an understanding thereof when considered in conjunction with the accompanying drawings in which:

FIGURE 1 is a side view of one modification of the present invention shown in position of use;

FIGS. 2 through 8 are fragmentary side views of other modifications of the device shown in FIG. 1;

Figure 9:
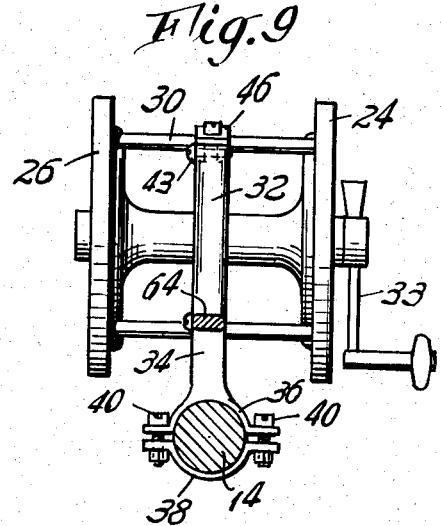
FIG. 9 is a vertical sectional view taken on the line 9—9 of FIG. 1.
Figure 11:
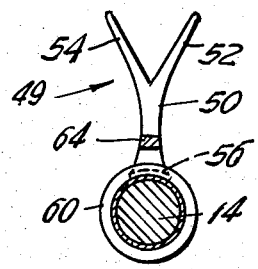
FIG. 11 is a vertical sectional view taken on the line 11—11 of FIG. 1.
Figure 10:
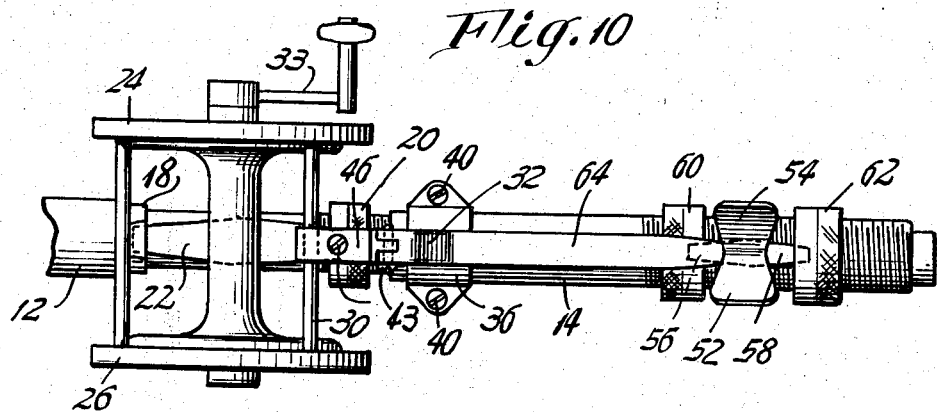
FIG. 10 is a plan view of the device of FIG. 1.

Referring to FIGS. 1 and 9–11, there is shown a device which embodies the principles of the present invention in both its broader and more limited aspects. A fishing rod 10 comprises a coaxial shaft 12 and handle portion 14, the handle 14 having a reel seat 16 with the customary fixed and movable collars 18 and 20 respectively for securing a reel mount 22 to the seat 16. A reel 24 of any desired construction is secured by suitable means to the reel mount 22, the reel having conventional side frame members 26 and 28 which are secured together by elongate screws, bolts, or connecting rods 30. The reel is also provided with a crank 33 which is mounted to turn about the longitudinal axis of the reel, or closely adjacent thereto.

In its broader aspects the invention is embodied in an elongate hand grip 32 which extends substantially vertically upwardly from the handle 14, preferably having a slight forward inclination relative to the handle so as to be in a position convenient for palm and finger encirclement by the user when his hand, wrist, and forearm are in substantial parallelism with the rod 10. The hand grip 32 is positioned in vertically spaced relationship with the handle portion 14 such that the approximate midpoint of the hand grip 32 lies in a plane parallel to the rod and passing through the reel. In this position, the hand, wrist, and forearm of the user are also disposed in this plane, with the result that the angular forces normally tending to rotate the rod and the user's wrist axially upon turning of the crank 33 are equalized in opposite directions since the axis of rotation of these forces is now substantially coincident with the midpoint of the hand grip. Thus the tendency for rotation or turnover of the rod, which can become quite severe, is reduced to an absolute minimum.

The hand grip 32 is secured to the rod 10 in the position described above, either by connection through the reel or by direct connection to the rod handle portion 14 or a combination of both. In the modification shown in FIG. 1, the last named method of securement is utilized in which the hand grip 32 is connected to a base 34 having a U-shaped clamp portion 36 adapted to engage the upper surface of the handle portion 14, another clamp portion 38 cooperating with the clamp portion 36 to secure the base 34 to the handle 14 by means of the screws 40.

Upper and lower forwardly extending arms 42 and 44, respectively, are pivotally connected, as by screws 43 and 45, to the upper and lower ends of the hand grip 32, and are also connected to a pair of bolts or connecting rods 30 by means of the clamping bar 46 and screw 48 provided on each of the arms 42 and 44. The pivot screws 43 and 45 facilitate vertical adjustment of the arms 42 and 44 to accommodate reels having different spacing between connecting rods. It is apparent that this is an extremely rigid and strong connection of the hand grip 32 to the rod 10 and is well suited to conditions encountered in deep sea fishing where extreme forces may be exerted upon the rod and reel while playing and landing a fish.

Additional control in manipulating the fishing rod, both while waiting for a strike and while landing the catch, is provided by arm support means 49 disposed rearwardly of the hand grip and mounted on the rod in position to engage the undersurface of the user's arm substantially midway between his wrist and elbow, and also positioned in upwardly spaced relationship with the rod handle so as to maintain the user's hand, wrist, and forearm in substantial parallelism with the axis of the rod. Referring again to FIGS. 1 and 9 through 11, the arm support 49 comprises a bifurcated member having a base 50 with a pair of upwardly and outwardly extending arms 52 and 54 respectively, the divergence of the arms being such as to comfortably partially embrace the underside of the user's arm, and to support the arm in substantial alignment with the user's wrist and hand when the hand grip 32 is being grasped as shown in FIGURE 1.

The arm support 49 is secured to the rod 10 in the position described either by connection through the hand grip support or by direct conection to the rod, or by a combination of both. In the modification shown in FIGURE 1, again the last named method of securement is utilized for maximum strength. The base 50 is provided with forwardly and rearwardly projecting legs 56 and 58 respectively, the legs resting on the rod handle 14 and being secured thereto by a pair of threaded collars 60 and 62. The hand grip 32 and the arm support 49 are combined into a unitary structure by provision of a connecting rod or arm 64 which joins the base 50 of the arm support 49 to the base 34 of the hand grip. The connecting rod 64 both facilitates handling of the device before it is connected to the rod and also further strengthens the hand grip by providing lateral support to the base 34 by the connection to a spaced apart portion of the rod handle 14. It should again be noted that the complete structure as illustrated in FIGURE 1 is exceptionally strong and rigidly mounted and particularly adapted to situations where the most adverse fishing conditions may be encountered.

FIG. 2 illustrates the simplest modification of the invention wherein the hand grip 32 is secured to the reel 24 in the position above described only by the upper arm 42 and clamp 46. In this embodiment the arm 42 need not pivotally be connected to the hand grip 32 and the two parts may be formed as a unitary piece. This construction is very inexpensive to manufacture and is easily installed when the situation requires, and it is well suited to fishing conditions where minimal forces on the rod and reel will be encountered.

A slightly more rigid modification of this device is shown in FIG. 3 wherein the hand grip 32 is provided with both the upper and lower connecting arms 42 and 44, each having the adjustable clamp 46 for connection to the reel connecting rods 30. In this construction, the arms 42 and 44 again must be pivotally connected to the hand grip 32 as by the screws 43 and 45 to facilitate connection of the device to different reels. This construction is adapted to use where relatively light forces on the rod and reel will be encountered, but which nevertheless require a more rigid connection of the hand grip to the reel than is provided by the modification of FIG. 2.

FIG. 4 shows another modification of the device shown in FIGURE 1, in which the combined hand grip 32 and arm support 49 is provided but is designed for fishing conditions somewhat less severe than those for which the device shown in FIGURE 1 is intended. In this modification, the arm support 49 is connected directly to the rod handle by means of the legs 56 and 58 and the securing collars 60 and 62 which are threadedly engaged with the rod handle. The hand grip 32 is pivotally connected to the reel by the upper arm 44 and the clamp 46, the pivot screw 43 being provided to accommodate different reels while still maintaining the hand grip 32 in the desired position in relation to the axis of the reel. The connecting rod 64 is provided between the base 50 of the arm support and the lower end of the hand grip which is approximately coincident with the location of the base 34 illustrated in FIGURE 1. Thus the hand grip 32 is strengthened by the lateral support provided by the rod 64, and the device as a whole is convenient to handle and mount by virtue of its being a unitary construction.

FIG. 5 shows a modification of the device in which the hand grip 32 is connected to the rod both directly and through the reel 24. The hand grip 32 is provided with the pivotally connected upper arm 42 which is connected to the reel 24 by means of the clamp 46. The base 34 of the hand grip 32 is connected to the rod handle 14 by means of the clamp portions 36 and 38 and screw 40. This construction is suitable for fishing under conditions where moderate forces on the rod and reel will be encountered, having both the advantages of considerable strength and rigidity as well as simplicity of installation.

A further simplified modification is shown in FIG. 6 in which the hand grip 32 is connected only to the rod handle 14 by means of the base 34 being provided with forwardly and rearwardly projecting legs 64 and 66 which are secured to the rod by means of collars 68 and 70 threadedly engaged with the rod handle 14. This modification is suited for use under conditions similar to those for which the modification of FIG. 2 is intended. However, the hand grip 32 is more rigidly fixed to the rod and therefore will resist slightly greater forces than will the construction of FIG. 2. It is also more readily mounted or removed since it does not require the use of any tools for loosening or tightening screws.

FIG. 7 shows a further modification of the combined hand grip and arm support in which the arm support 49 is suspended in cantilever manner through the connecting rod 64, the latter being connected to the base 34 of the hand grip 32. The entire device is connected to the rod handle 14 by means of the clamp portions 36 and 38 and screws 40 at the base 34 of the hand grip. This modification provides the advantages mentioned above in connection with the combined hand grip and arm support and because of its simplicity of construction and mounting is particularly adapted to use with fly rods and reels.

FIG. 8 shows a modification of the combined hand grip and arm support having the distinction that the hand grip 32 and arm support 49 are separate units, each of which is individually connected to the rod handle 14. The hand grip is connected by the clamp portions 36 and 38 and the screws 40 while the arm support 49 is connected by the legs 56 and 58 and the threaded collars 60 and 62. The hand grip and arm support may be used separately if desired by the user, and when used together they provide a relatively strong manipulating and supporting devise which, as with the modification of FIG. 4, will withstand moderately strong forces on the rod and reel.

Figure 12:
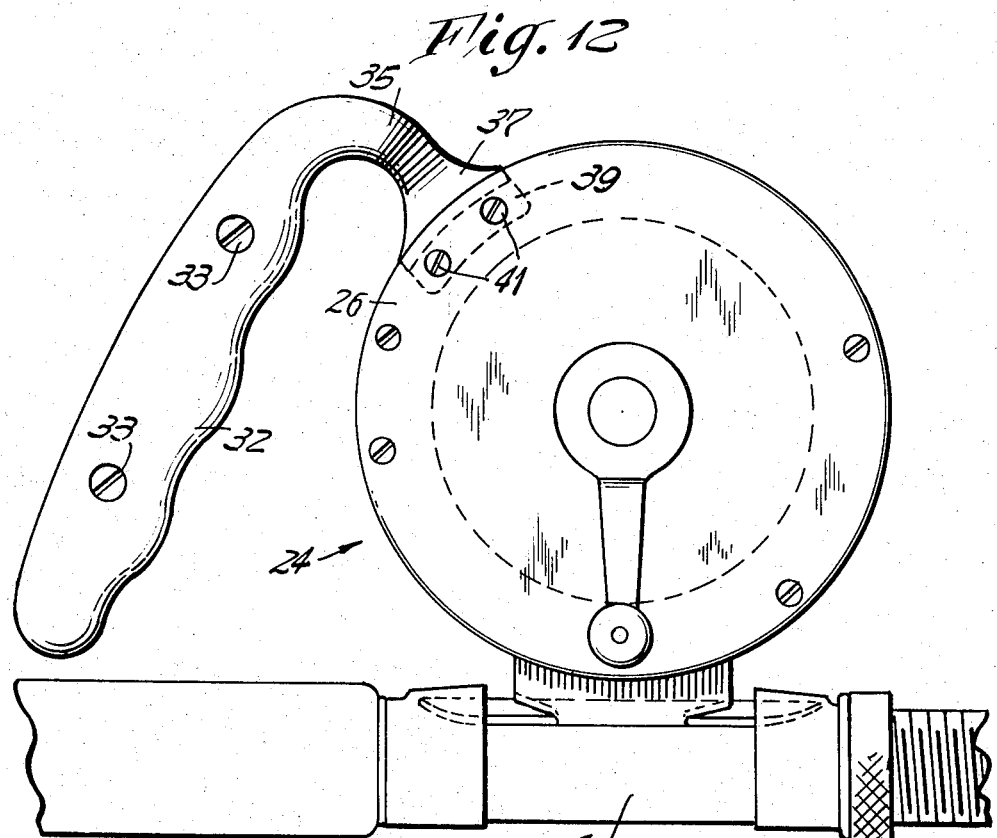
FIGS. 12 and 13 are side and plan views respectively of still another modification of the device.
Figure 13:
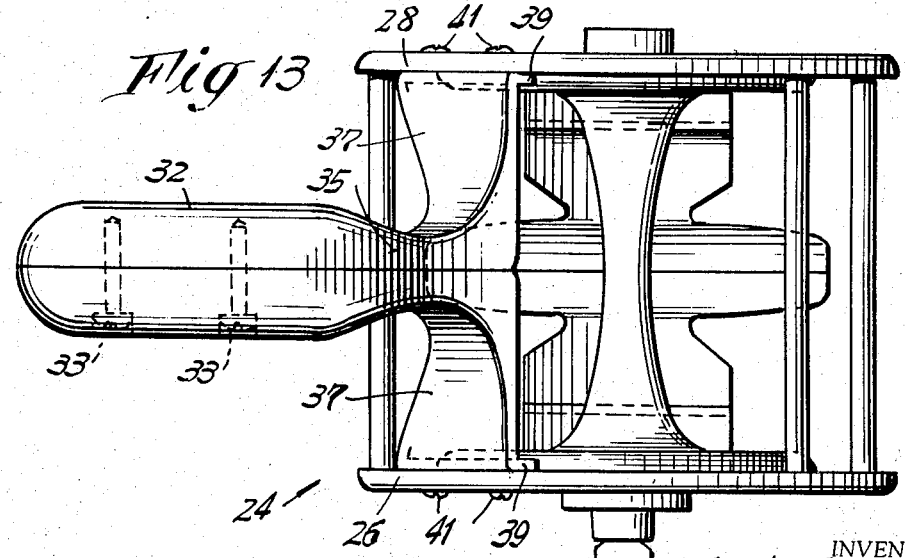

FIGS. 12 and 13 show still another modification similar to that shown in FIG. 2, in which the hand grip 32, which may be formed split as half sections which are suitably secured together as by the screws 33, is provided with a forwardly curved neck portion 35 which terminates in a pair of laterally extending wings 37 adapted to extend the width of the reel 24. The wings 37 terminate in arcuate lugs 39 which are bent inwardly at right angles to the wings 37 so as to lie against the inner faces of the reel frames 26 and 28. The lugs 39 are secured to the reel frames as by screws 41. This embodiment is again well suited for use under conditions of light to moderate forces on the rod and reel similar to those for which the embodiments of FIGS. 2 and 3 are intended. The hand grip of this embodiment may be used with any reel regardless of the disposition or arrangement of the connecting rods thereof.

Variations and modifications may be made within the scope of the claims and portions of the improvements may be used without others.

What I claim is:

1. For use with a fishing rod having a coaxial handle portion and an upstanding reel mounted directly on the handle portion, a handling device comprising an elongate substantially vertically extending hand grip positioned adjacent to but rearwardly spaced from the reel, the hand grip being inclined slightly forwardly so as to be in a position convenient for palm and finger encirclement when the hand, wrist, and forearm of the user are in alignment and substantially parallel with the rod, the hand grip being upwardly spaced from the handle portion in position to have the aprpoximate midpoint of the hand grip lying in the plane parallel to the rod and passing through the axis of the reel, and means for removably connecting the hand grip to the rod in the position aforesaid, said means including means for directly connecting the hand grip to the reel.

2. A device according to claim 1 wherein said connecting means connects the hand grip solely to the reel.

3. A device according to claim 1 wherein the means for connecting the hand grip directly to the reel comprises an arm having one end joined to the upper portion of the hand grip, and clamp means on the other end of the arm adapted to removably engage a portion of the reel frame.

4. A device according to claim 1 wherein the means for connecting the hand grip directly to the reel comprises a pair of arms each joined at one end to the upper and lower portions of the hand grip, and clamp means on the other end of each arm adapted to removably engage spaced apart portions of the reel frame.

5. A device according to claim 1 wherein the means for connecting the hand grip directly to the reel comprises a neck portion formed on the upper end of the hand grip and extending forwardly toward the reel, the neck portion terminating in opposed laterally extending wings, and means for connecting the wings to the side frames of the reel and be secured thereto.

6. A device according to claim 1 wherein there are means connecting the hand grip directly to the handle portion of the rod.

7. A device according to claim 6 wherein said means for connecting the hand grip to the reel comprises at least one arm joined to one of the ends of the hand grip and clamp means on the other end of the arm adapted to removably engage a portion of the reel frame, and wherein said means for connecting the hand grip to the handle portion comprises a base joined to the lower end of the hand grip and clamp means for removably securing the base to the handle portion.

8. A device according to claim 1 wherein there are means for connecting the hand grip directly to the handle portion comprising a base joined to the lower end of the hand grip and clamp means for removably securing the base to the handle portion of the rod.

9. A device according to claim 1 wherein there are means for connecting the hand grip directly to the handle portion comprising a base joined to the lower end of the hand grip and forwardly and rearwardly extending lugs on the base adapted to rest on the handle portion and be secured thereto by threaded collars on the handle portion of the rod.

10. A device according to claim 1 further including arm support means disposed rearwardly of the hand grip and upwardly of the rod handle so as to support the user's forearm in parallelism with the rod axis, the arm support means being shaped to receive and partially embrace the undersurface of the user's forearm and adapted to be continuously urged thereagainst by an upward force about the user's hand as a fulcrum and responsive to the weight of the rod or a downward pull on the tip of the shaft, thereby preventing the rear end of the rod from slipping off the user's arm while the user's hand, wrist, and forearm are maintained in said parallelism with the rod axis, and means for connecting the arm support means to the handle portion of the rod in the position aforesaid.

11. A device according to claim 10 wherein said arm support means comprises an upwardly facing yoke positioned in relation to the hand grip so as to engage the forearm of a user substantially intermediate the elbow and wrist of the user.

12. A device according to claim 10 wherein said means for connecting the arm support means to the handle portion comprises a rod joined at one end to the hand grip adjacent the lower end thereof, the other end of the rod being joined to the arm support means.

13. A device according to claim 10 wherein the arm support means further includes a base having forwardly and rearwardly projecting lugs adapted to rest on the handle portion and be secured thereto by threaded collars on the handle portion.

14. A device according to claim 10, in which the upper end of the hand grip is directly connected to the reel and the lower end of the hand grip is connected independently of the reel directly to the arm support means.

15. A device according to claim 1, in which the upper end of the hand grip is directly connected to the reel, and the lower end of the hand grip is directly connected to the handle.

References Cited

UNITED STATES PATENTS

| 1,927,576 | 9/1933 | Smith | 43—25 |
| 2,149,837 | 3/1939 | Browne | 43—23 |
| 2,158,104 | 5/1939 | Bowen | 43—25 |
| 2,658,697 | 11/1953 | Steinbaugh | 43—21.2 X |
| 2,499,117 | 2/1950 | Smith. | |
| 2,499,821 | 3/1950 | Geisheimer | 43—21.2 |

FOREIGN PATENTS 20,882 of 1896 Great Britain.

SAMUEL KOREN, *Primary Examiner.*

J. H. CZERWONKY, *Assistant Examiner.*